United States Patent
Miyajima et al.

(10) Patent No.: US 6,321,813 B1
(45) Date of Patent: Nov. 27, 2001

(54) APPARATUS FOR BONDING POUR SPOUT TO CONTAINERS

(75) Inventors: Tohru Miyajima; Hiroshi Kitajima; Michio Ueda, all of Tokushima (JP)

(73) Assignee: Shikoku Kakoki Co., Ltd., Itano-gun (JP)

( * ) Notice: Subject to any disclaimer, the term of this patent is extended or adjusted under 35 U.S.C. 154(b) by 0 days.

(21) Appl. No.: 09/332,020

(22) Filed: Jun. 14, 1999

(30) Foreign Application Priority Data

Jun. 15, 1998 (JP) .................................................. 10-167134

(51) Int. Cl.$^7$ .............................. B65B 61/00; B32B 31/00
(52) U.S. Cl. ................. 156/497; 156/580.1; 156/580.2; 53/133.2; 53/410
(58) Field of Search ............................... 156/497, 580.1, 156/580.2, 499; 53/133.2, 133.1, 563; 493/73, 213; 425/174.2

(56) References Cited

U.S. PATENT DOCUMENTS

| | | | | |
|---|---|---|---|---|
| 1,989,039 | * | 1/1935 | Geyer ..................................... | 156/556 |
| 5,058,360 | * | 10/1991 | Yamazaki ............................. | 53/133.2 |
| 5,304,265 | * | 4/1994 | Keeler .................................... | 156/64 |
| 5,601,669 | * | 2/1997 | Moody et al. ........................ | 156/73.1 |
| 5,653,832 | * | 8/1997 | Thompson et al. .................. | 156/73.1 |
| 5,964,687 | * | 10/1999 | Rogalski et al. ...................... | 493/102 |
| 5,983,599 | * | 11/1999 | Krueger ................................. | 53/410 |
| 6,085,489 | * | 7/2000 | Bachner et al. ....................... | 53/410 |

FOREIGN PATENT DOCUMENTS

| | | |
|---|---|---|
| 0 450 146 | 10/1991 | (EP) . |
| 2 238 287 | 5/1991 | (GB) . |
| 61-104833 | 5/1986 | (JP) . |
| 03-288636 | 12/1991 | (JP) . |
| 04-086250 | 3/1992 | (JP) . |
| WO 95 05317 | 2/1995 | (WO) . |

* cited by examiner

*Primary Examiner*—Richard Crispino
*Assistant Examiner*—Sue A. Purvis
(74) *Attorney, Agent, or Firm*—Armstrong, Westerman, Hattori, McLeland & Naughton, LLP

(57) ABSTRACT

The invention provides an apparatus for use with containers 11 each in the form of a rectangular or square tube and having an open upper end and an outlet 25 in a top forming portion 12 of the container, for bonding a pour spout 31 to the container edge portion defining the outlet. The apparatus comprises a conveyor 41 for transporting the containers 11 so as to halt the containers successively at a bonding station, and a support 44 movable into contact with the outlet-defining edge portion of the container 11 as halted at the bonding station from inside the container for receiving the pressure of bonding. The support 44 is so disposed as to be movable into and out of the container 11 along an arc path and has a contact face 83 facing outwardly of the arc path.

6 Claims, 4 Drawing Sheets

APPARATUS FOR BONDING POUR SPOUT TO CONTAINERS

BACKGROUND OF THE INVENTION

The present invention relates to an apparatus for use with containers to be filled with a liquid, such as milk, juice or sake, and each in the form of a rectangular or square tube and having an open upper end and an outlet in a top forming portion of the container, for bonding a pour spout to the container edge portion defining the outlet.

As disclosed, for example, in JP-A No. 61-104833, apparatus of the type mentioned are already known which comprise a conveyor for transporting containers so as to halt the containers successively at a bonding station, a support fixedly disposed above the container to be halted at the bonding station, and a lifter for raising the container from the conveyor for the support to fit into the container for contact therewith from inside and to receive the pressure of bonding.

With the conventional apparatus described, the support is likely to cause damage to the inner surface of the container since the container inner surface and the contact face of the support are moved relative to each other in face-to-face contact when the container is lifted from the conveyor and fitted to the support.

Further in the field of packaging machines, it is practice to prepare different kinds of containers which are made different in capacity by being given varying heights although having the same cross sectional area.

When the bonding apparatus described is to be used for containers of altered height, there arises a need to vary the level to which the containers are to be raised by the lifter in conformity with the height of the containers. This renders the lifter complex in construction.

SUMMARY OF THE INVENTION

An object of the present invention is to provide an apparatus for bonding a pour spout to each of containers without the likelihood that the inner surface of the container will be damaged by a support to be brought into contact therewith.

The present invention provides an apparatus for bonding a pour spout to an edge portion of each of tubular containers defining an outlet formed in the container, the apparatus having a support movable into contact with the outlet-defining edge portion from inside the container for receiving the pressure of bonding, the apparatus being characterized in that the support is so disposed as to be movable into and out of the container along an arc path and has a contact face facing outwardly of the arc path.

With the spout bonding apparatus of the invention, the support is so disposed as to be movable into and out of the container along an arc path and has a contact face facing outwardly of the arc path. It is therefore only when the support is contacted with the outlet-defining edge portion of the container from inside thereof that the contact face comes into face-to-face contact with the inner surface of the container, consequently eliminating the likelihood of the support causing damage to the container inner surface.

The spout bonding apparatus preferably comprises a conveyor for transporting the containers as held thereto with an opening of each container facing upward so as to halt the containers successively at a bonding station, such that the container to be contacted by the support is halted at the bonding station.

The support is attached to a free end of an arm pivotally movable upward and downward so as to be advanced into the container by the downward pivotal movement of the arm and to be retracted from the container by the upward pivotal movement of the arm. The arm can then be caused to reliably perform an arc motion.

The arm is further restrained from pivotally moving downward by a stopper with the contact face of the support positioned vertically as moved into contact with the outlet-defining edge portion from inside the container, and the center of pivotal movement of the arm is not higher than the level of a lower end of the contact face when the arm is restrained from pivotally moving downward by the stopper. The support can then be positioned in place as moved into contact with the outlet-defining edge portion of the container from inside the container.

The support has a pair of positioning faces orthogonal to the contact face and parallel to each other to face toward opposite directions, the positioning faces being spaced apart by a distance equal to the distance between inner surfaces of two end panels of the container opposed to each other and orthogonal to a container end panel having the outlet, and the contact face is formed at an upper end thereof with a horizontal ridge to be brought into contact with an upper end of the container with the arm restrained from pivotally moving downward by the stopper. The support can then be positioned in place by the contact face and the two positioning faces with respect to the horizontal direction of the container, and by the ridge with respect to the vertical direction of the container.

Furthermore, the conveyor comprises holders for holding the containers upwardly and downwardly movably, and a rail movable upward or downward in accordance with the height of the containers for receiving the bottoms of the containers as held by the holders and guiding the containers. Containers of different heights can then be handled by a simple construction.

DESCRIPTION OF THE PREFERRED EMBODIMENTS

Embodiments of the invention will be described below with reference to the drawings.

Figure 3:
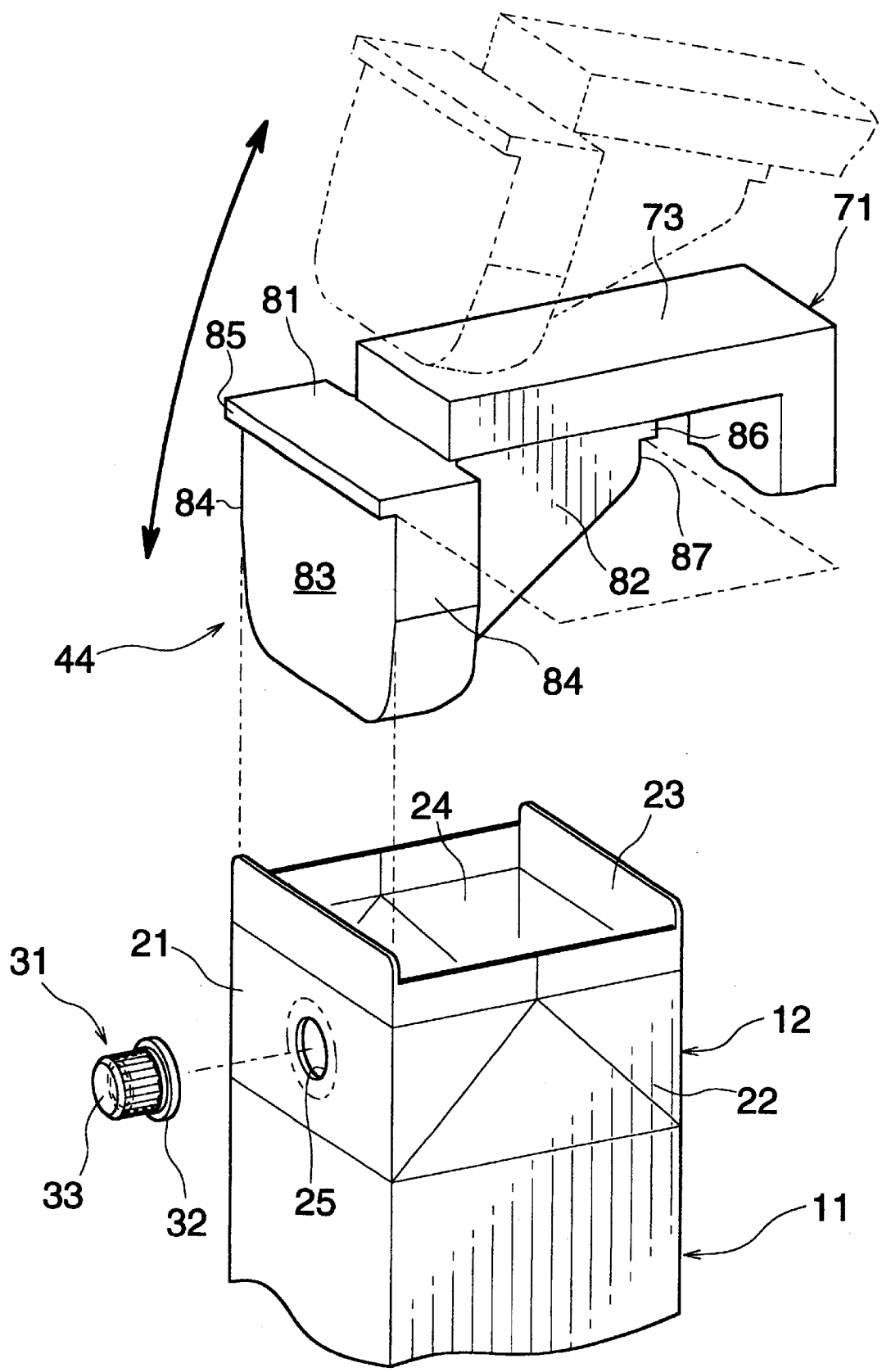
FIG. 3 is a perspective view showing a support of the apparatus along with a container.

Referring to FIG. 3, containers 11 are each in the form of a tube having a rectangular or square cross section and a bottom and made from a paper-base laminate which has a heat sealing layer of polyethylene or the like over each of its inner and outer surfaces. The container has a top forming portion 12 in the form of a tube of rectangular or square cross section and including first to fourth top panels 21 to 24 which are integral with one another. The first top panel 21 is formed with a circular outlet 25 centrally thereof.

A pour spout 31 is made from a heat-sealable or thermally bondable plastic, such as polyethylene, in the form of a hollow cylinder. The pour spout 31 has a base end formed with a flange 32, an open outer end covered with a cap 33, and a readily breakable closure (not shown) in its interior.

Figure 1:
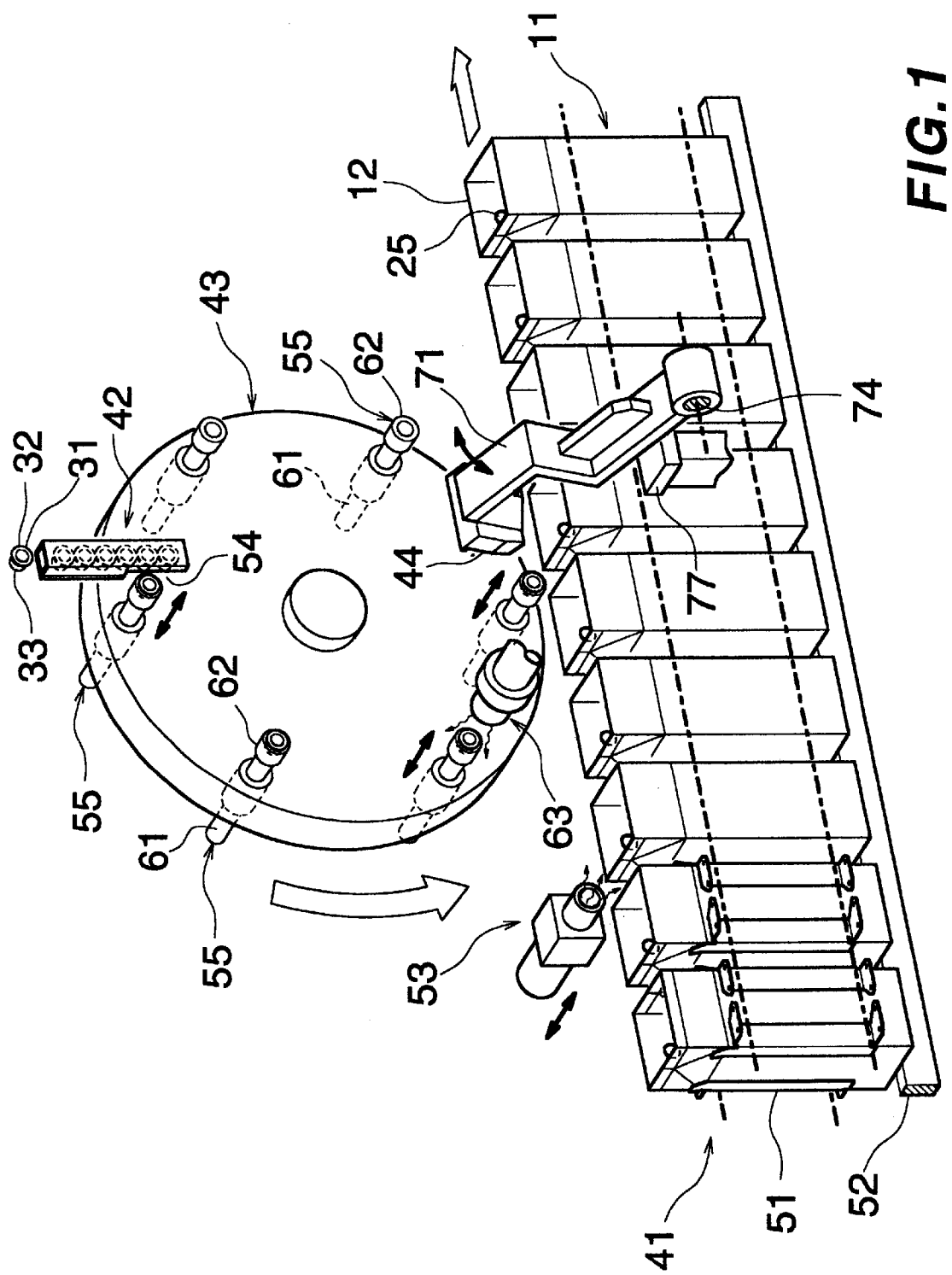
FIG. 1 is a perspective view of a pour spout bonding apparatus embodying the invention.

FIG. 1 shows a container spout bonding apparatus, which comprises an intermittently driven conveyor 41 for transporting containers 11 so as to halt the containers one after another at a bonding station, a spout supply chute 42 disposed above the path of transport of containers 11 at the bonding station, a rotor 43 in the form of a vertical disk disposed at the left of the chute 42 and the transport path at the bonding station for transferring pour spouts 31, and a support 44 movable into the container 11 as halted at the bonding station to contact the panel edge portion defining the outlet 25 from inside the container 11 for receiving the pressure of bonding.

The conveyor 41 comprises holders 51 for holding containers 11 upwardly or downwardly movably, and a horizontal rail 52 for supporting the bottoms of containers 11 as held by the holders 51 and guiding the containers 11.

The conveyor 41 is adapted to transport different kinds of containers which are made to have varying capacities by being given different heights although having the same cross sectional area. Containers 11 are held by the holders 51 with their outlets 25 facing to the left. The rail 52 is moved up or down by unillustrated level adjusting means in accordance with the height of the containers 11 delivered onto the conveyor 41 so as to position the container upper ends at a constant level during transport regardless of the container height.

A hot air nozzle 53 facing rightward for heating containers is disposed leftwardly or rightwardly movably upstream from the bonding station of the transport path.

The chute 42 has accommodated therein a multiplicity of pour spouts 31 as laid on one another in a vertical row with their caps facing to the left. The chute 42 has at its lower end a delivery opening 54 facing to the left.

The rotor 43 is rotatingly driven intermittently counter-clockwise as indicated by an arrow in FIG. 1. The rotor 43 has attached thereto a plurality of spout holders 55 arranged along its outer periphery and equidistantly spaced apart circumferentially of the rotor. The spout holders 55 each comprise a horizontal guide rod 61 slidably extending through the rotor 43 transversely thereof, and a cup 62 attached to the right end of the guide rod 61 and facing to the right. A hot air nozzle 63 facing leftward for heating pour spouts is disposed at a holder halting position along the path of movement of holders 55 upstream from the bonding station.

Figure 2:
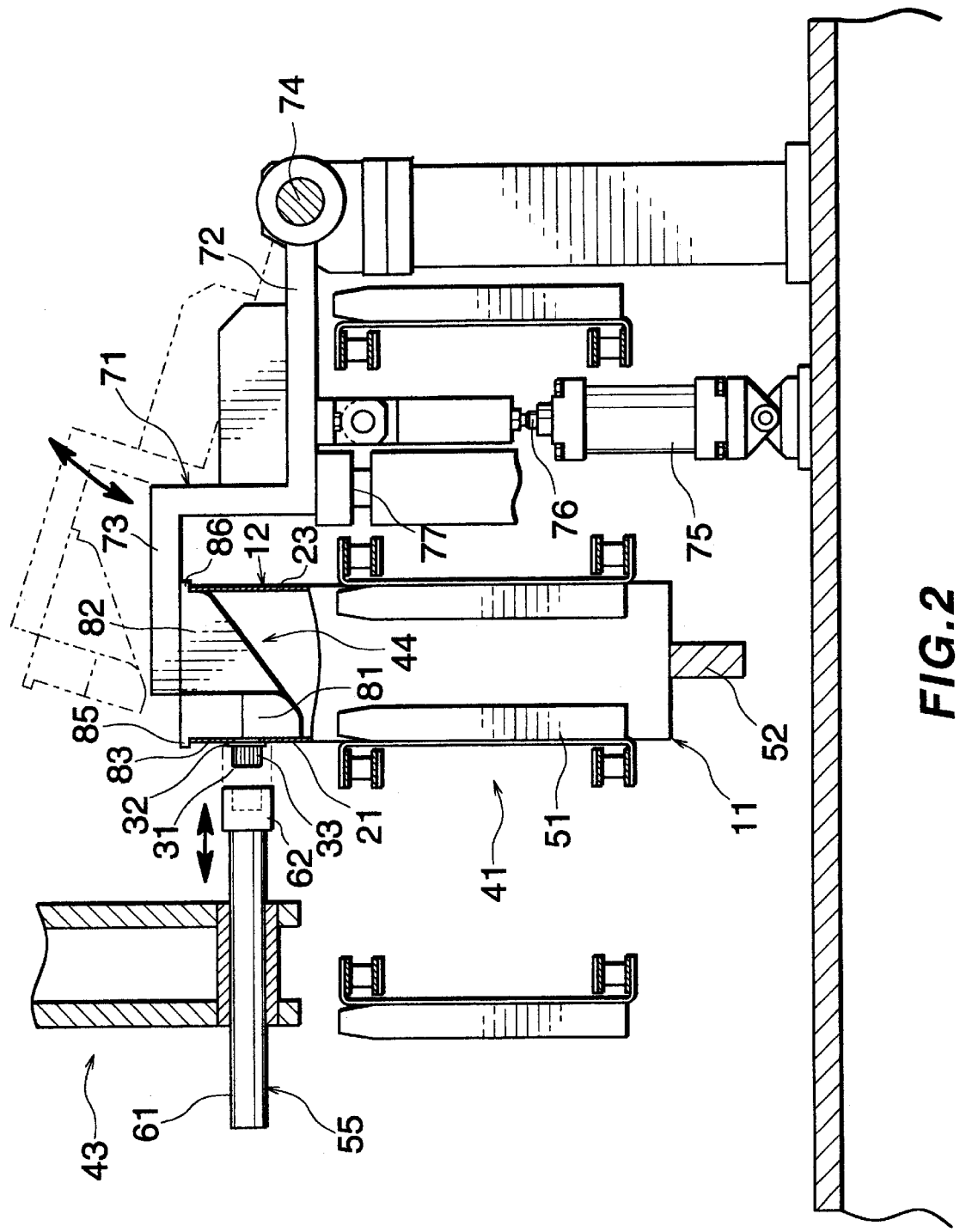
FIG. 2 is a fragmentary view in vertical cross section of the apparatus.

With reference to FIG. 2, the support 44 is attached to the lower side of free end of an arm 71 pivotally movable upward and downward and extending from the right side of the container transport path leftward to above the transport path. The arm 71 is generally in the form of a crank when seen from the rear, has a base end portion 72 and a free end portion 73 and is attached at the base end portion to a horizontal support rod 74 extending longitudinally of the conveyor 41. The axis of the support rod 74 is positioned at a lower level than the center of the outlet 25 of the container 11 transported to the bonding station. A vertically upward fluid pressure cylinder 75 has a piston rod 76, which is connected to a lengthwise intermediate part of the arm base end portion 72. A stopper 77 is disposed at the left of the piston rod 76 immediately adjacent thereto. The arm 71 is restrained from pivotally moving downward by the bearing contact of the lower surface of left end of the base end portion 72 with the stopper 77.

As shown in detail in FIG. 3, the support 44 comprises a support body 81 in the form of a rectangular plate and having a thickness transversely of the conveyor, and a triangular plate rib 82 perpendicular to the right side surface of the support body 81 and fixedly connecting the body 81 to the lower surface of the arm free end portion 73. The support body 81 has a left side surface serving as a contact face 83, and front and rear end faces orthogonal to the contact face 83, parallel to each other and serving as front and rear positioning faces 84. The two positioning faces 84 are spaced apart by a distance equal to the distance between the inner surface of the second top panel 22 of the container 11 and the inner surface of the fourth top panel 24 thereof. A leftward ridge 85 is formed at the upper end of the contact face 83. A rightward ridge 86 is formed at the right end of the rib 82 by cutting out the lower portion of the right end. When the contact face 83 is in a vertical position, the lower face of the leftward ridge 85 and the lower face of the rightward ridge 86 are at the same level. The rib 82 has a right positioning face 87 vertically extending downward from the base of the rightward ridge 86. The right positioning face 87 is spaced from the contact face 83 by a distance equal to the distance between the inner surface of the first top panel 21 of the container 11 and the inner surface of the third top panel 23 thereof.

With the support 44 inserted in the container 11, the lower end of the contact face 83 is at approximately the same level as the axis of the support rod 74.

The positioning faces 84 are diminished by reducing the thickness of the support body 81 and further greatly chamfering the lower portion thereof, and the cut-out right end portion of the rib 82 is diminished by slanting the bottom of the rib 82, so as not to influence the state of the container inner surface when these faces 84 and the end portion are brought into contact with the inner surface.

When a container 11 is transported to the location of the hot air nozzle 53, the nozzle 53 is brought close to the container 11 to heat the outer surface of the outlet-defining edge portion of the container 11 by the nozzle 53 before the container is fed to the bonding station.

On the other hand, when a spout holder 55 is brought to a halt as opposed to the delivery opening 54 of the chute 42, the spout holder 55 is moved rightward and leftward by unillustrated means, whereby the cup 62 of the holder 55 is fitted to the cap 33 of the pour spout 31 at the lowermost position inside the chute 42, and the pour spout 31 as held by the holder 55 in this state is taken out of the chute 42.

When the holder 55 carrying the pour spout 31 is halted as opposed to the spout heating hot air nozzle 63, the spout holder 55 is moved rightward and leftward again, whereby the rear face of the flange 32 of the pour spout 31 is heated before being transported to the bonding station.

When the pour spout 31 having the heated flange 32 is brought to the bonding station, the spout holder 55 is moved rightward to press the flange 32 of the pour spout 31 against the outer surface of the outlet-defining edge portion of the container 11, whereby the pour spout 31 is completely bonded to the container 11. Before the pour spout 31 is pressed against the container 11, the support 44 is advanced into the container 11 transported to the bonding station.

The arm 71 is pivotally movable upward and downward by the operation of the fluid pressure cylinder 75. The support 44 is advanced into the container by pivotally moving the arm 71 downward. The support 44 in this state is retracted from the container 11 by pivotally moving the arm 71 upward.

When the arm base end portion 72 and the arm free end portion 73 are brought to a horizontal position in the course of the downward movement of the arm 71, the base end portion 72 comes into contact with the stopper 77 to stop the downward pivotal movement of the arm 71. In this state, the contact face 83 of the support 44 is vertical and is positioned along the inner surface of the container first top panel 21. At this time, the front and rear positioning faces 84 are positioned along the inner surface of the second top panel 22 and that of the fourth top panel 24, with the right positioning face 87 along the inner surface of the third top panel 23. Furthermore, the bottom of the leftward ridge 85 and the bottom of the rightward ridge 86 are in contact with the upper end of the first top panel 21 and that of the third top panel 23, respectively.

In the course of the downward pivotal movement of the arm 71, the contact face 83 faces obliquely leftwardly upward and is eventually positioned vertically. The contact face 83 therefore remains out of contact with the first top panel 21 before assuming the vertical position, so that the support 44 is unlikely to cause damage to the first top panel 21.

Figure 4:
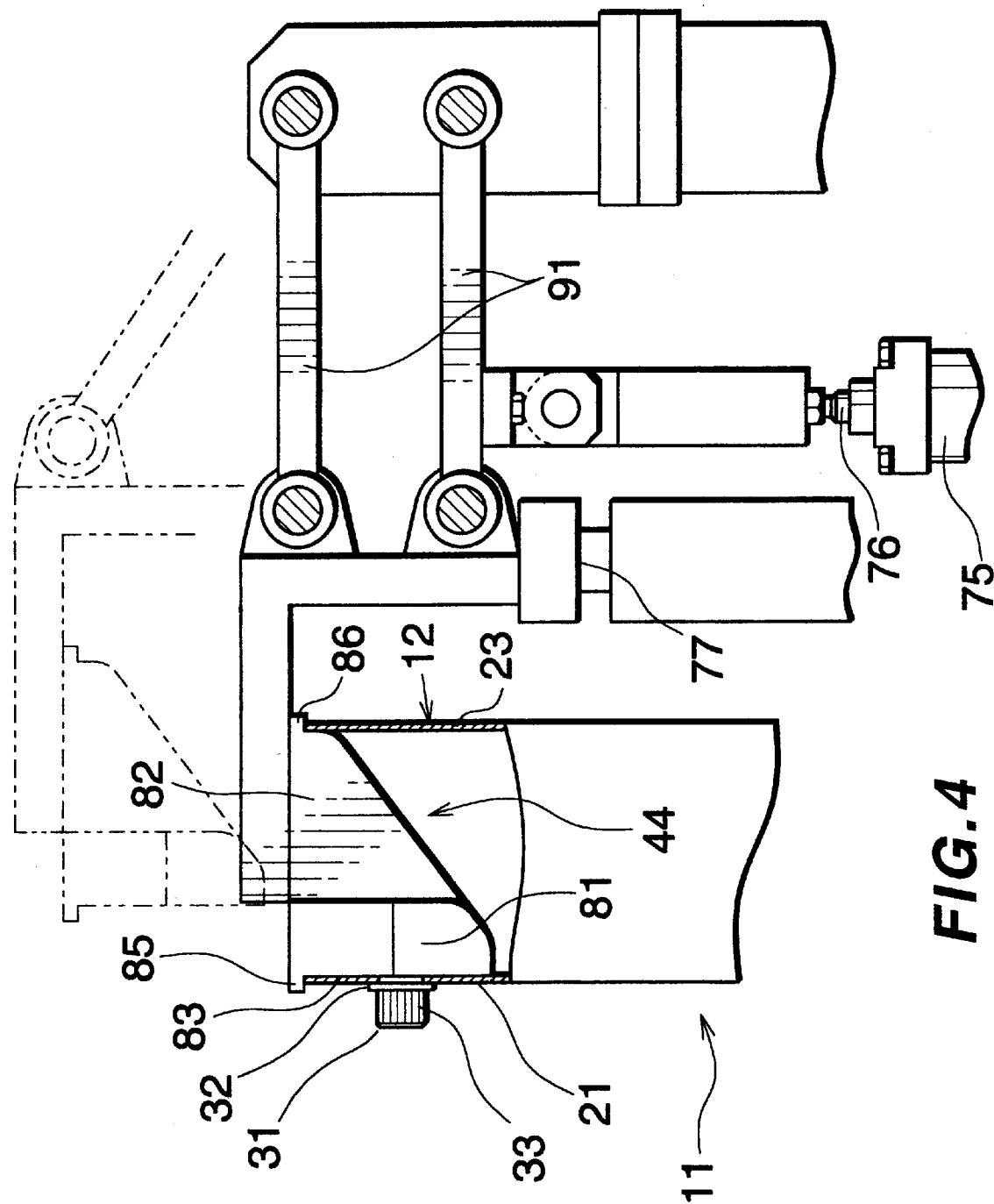
FIG. 4 is a view in cross section corresponding to FIG. 2 and showing a modification of the apparatus.

FIG. 4 shows a modification wherein the support 44 is pivotally moved by a pair of upper and lower parallel links 91 in place of the arm 71. When the contact face 83 is formed vertically, the contact face 83 is movable into and out of the container while being held vertical at all times. When the parallel links 91 are brought to a horizontal position, the contact face 83 is brought into contact with the inner surface of the first top panel 21.

With reference to FIG. 4, if the horizontal links 91 are horizontal or inclined leftwardly upward with the parallel link 91 in contact with the stopper 77, it is unlikely that the support 44 will interfere with the container 11 when moved into and out of the container 11. The center of pivotal movement of each link 91 need not be positioned at a level not higher than the level of the lower end of the contact face 83.

The present invention has been described above with reference to a case wherein the pour spout is bonded to the outer surface of the container. The apparatus disclosed in JP-A No. 61-104833 and described with reference to the prior art is adapted to insert the cap of the pour spout through the outlet from inside thereof and bond the flange of the spout to the inner surface of the outlet-defining edge portion. The present invention is applicable also to such a case. Although the ultrasonic bonding is used as the bonding method for the apparatus disclosed in this publication, ultrasonic bonding may be resorted to also according to the invention instead of thermal bonding.

The embodiment described can further be modified as will be described below.

The container, which is in the form of a tube having a rectangular or square cross section, a closed bottom and an open upper end according to the embodiment described, may alternatively be in the form of a tube of rectangular or square cross section which is open at its opposite ends before being closed at its bottom. The present invention may further alternatively be applied to tubular containers of circular cross section instead of such rectangular or square tube containers. In this case, the contact face of the support needs to be in the form of an arc in cross sectional contour in conformity with the container inner surface.

In transporting containers by a conveyor, the containers may be positioned with the open ends thereof facing to the left or right. In this case, the support needs to be pivotally moved leftward and rightward to advance into and retract from the container.

Although the outlet is formed in the top side of the container according to the embodiment described, the invention is applicable also to a case wherein the outlet is formed in the bottom side of the container.

What is claimed is:

1. An apparatus for bonding a pour spout to an edge portion of each of tubular containers defining an outlet formed in the container, the apparatus having a support movable into contact with the outlet-defining edge portion from inside the container for receiving the pressure of bonding, the apparatus being characterized in that the support is so disposed as to be movable into and out of the container along an arc path and has a contact face facing outwardly of the arc path, said contact face being in contact with said outlet-defining edge portion from inside the container upon completion of movement into the container along said arc path in the absence of any additional movement.

2. A bonding apparatus according to claim 1 which comprises a conveyor for transporting the containers as held thereto with an opening of each container facing upward so as to halt the containers successively at a bonding station and wherein the container to be contacted by the support is halted at the bonding station.

3. A bonding apparatus according to claim 2 wherein the support is attached to a free end of an arm pivotally movable upward and downward so as to be advanced into the container by the downward pivotal movement of the arm and to be retracted from the container by the upward pivotal movement of the arm.

4. A bonding apparatus according to claim 3 wherein the arm is restrained from pivotally moving downward by a stopper with the contact face of the support positioned vertically as moved into contact with the outlet-defining edge portion from inside the container, and the center of pivotal movement of the arm is not higher than the level of a lower end of the contact face when the arm is restrained from pivotally moving downward by the stopper.

5. A bonding apparatus according to claim 4 wherein the support has a pair of positioning faces orthogonal to the contact face and parallel to each other to face toward opposite directions, the positioning faces being spaced apart by a distance equal to the distance between inner surfaces of two end panels of the container opposed to each other and orthogonal to a container end panel having the outlet, and the contact face is formed at an upper end thereof with a horizontal ridge to be brought into contact with an upper end of the container with the arm restrained from pivotally moving downward by the stopper.

6. A bonding apparatus according to any one of claims 2 to 5 wherein the conveyor comprises holders for holding the containers upwardly and downwardly movably, and a rail movable upward or downward in accordance with the height of the containers for receiving the bottoms of the containers as held by the holders and guiding the containers.

* * * * *